United States Patent [19]
Kobayashi et al.

[11] 3,828,238
[45] Aug. 6, 1974

[54] NUMERICALLY CONTROLLED MACHINE TOOL INCLUDING BACKLASH ELIMINATION

[75] Inventors: Kengo Kobayashi, Kawasaki; Mitsuo Manabe, Tokyo, both of Japan

[73] Assignee: Funitsu Limited, Kanagawa-ken, Japan

[22] Filed: Apr. 20, 1972

[21] Appl. No.: 245,885

[30] Foreign Application Priority Data
Apr. 22, 1971 Japan............................ 46-26372

[52] U.S. Cl.................. 318/630, 318/597, 318/603
[51] Int. Cl. ........................................... G05b 11/01
[58] Field of Search .......... 318/630, 619, 572, 624, 318/597, 598, 603

[56] References Cited
UNITED STATES PATENTS

| | | | |
|---|---|---|---|
| 3,088,060 | 4/1963 | Ricke.................................. | 318/598 |
| 3,209,223 | 9/1965 | Scheib, Jr. ....................... | 318/630 X |
| 3,218,532 | 11/1965 | Tuscano............................. | 318/572 |
| 3,246,218 | 4/1966 | Centner et al................... | 318/598 X |
| 3,560,830 | 2/1971 | Steinberg............................ | 318/630 |
| 3,593,091 | 7/1971 | Ross.................................... | 318/572 |
| 3,594,626 | 7/1971 | Palmer............................ | 318/630 X |
| 3,605,000 | 9/1971 | Inaba.................................. | 318/619 |
| 3,619,757 | 11/1971 | Ioerger et al. ................... | 318/597 X |

*Primary Examiner*—T. E. Lynch
*Attorney, Agent, or Firm*—Maleson, Kimmelman and Rather

[57] ABSTRACT

A method of numerically controlling a machine through a servo system, a movable part of the machine being controlled in its displacement to a desired position according to a command pulse train, in which method the gain of the servo system is momentarily heightened when a change of direction of movement of the movable part of the machine is required during the control operation, so that the mechanical backlash of the machine is rapidly taken up to shorten dead time in the control operation.

5 Claims, 13 Drawing Figures

Fig. 1
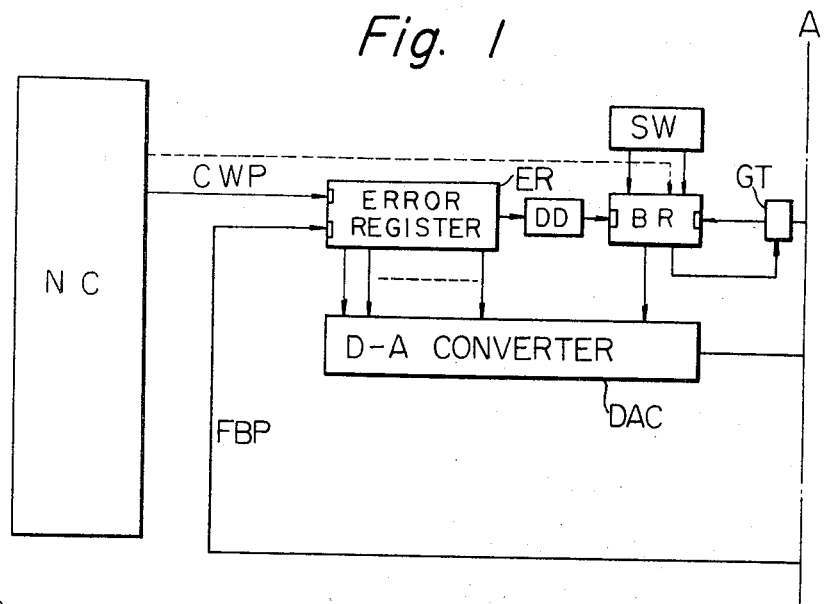
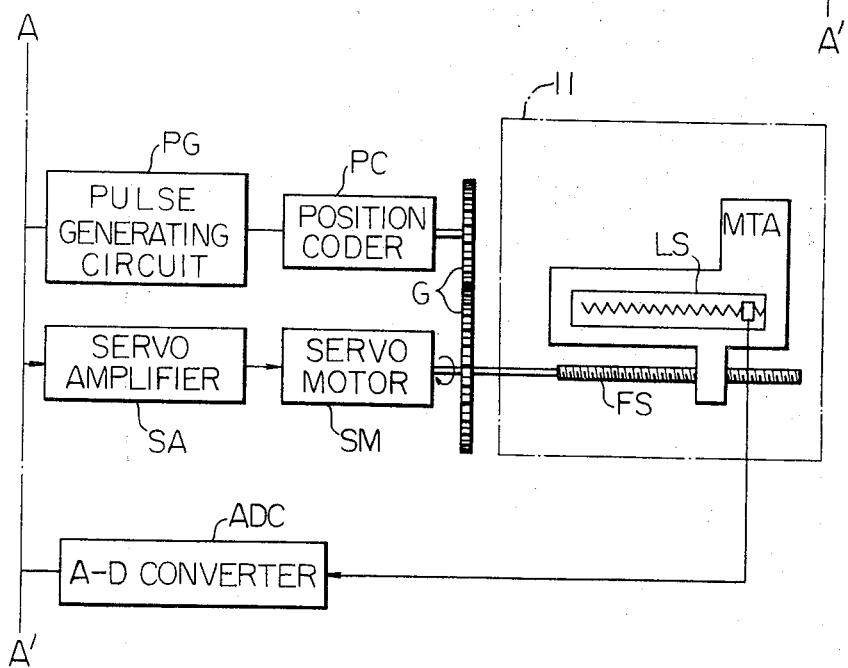

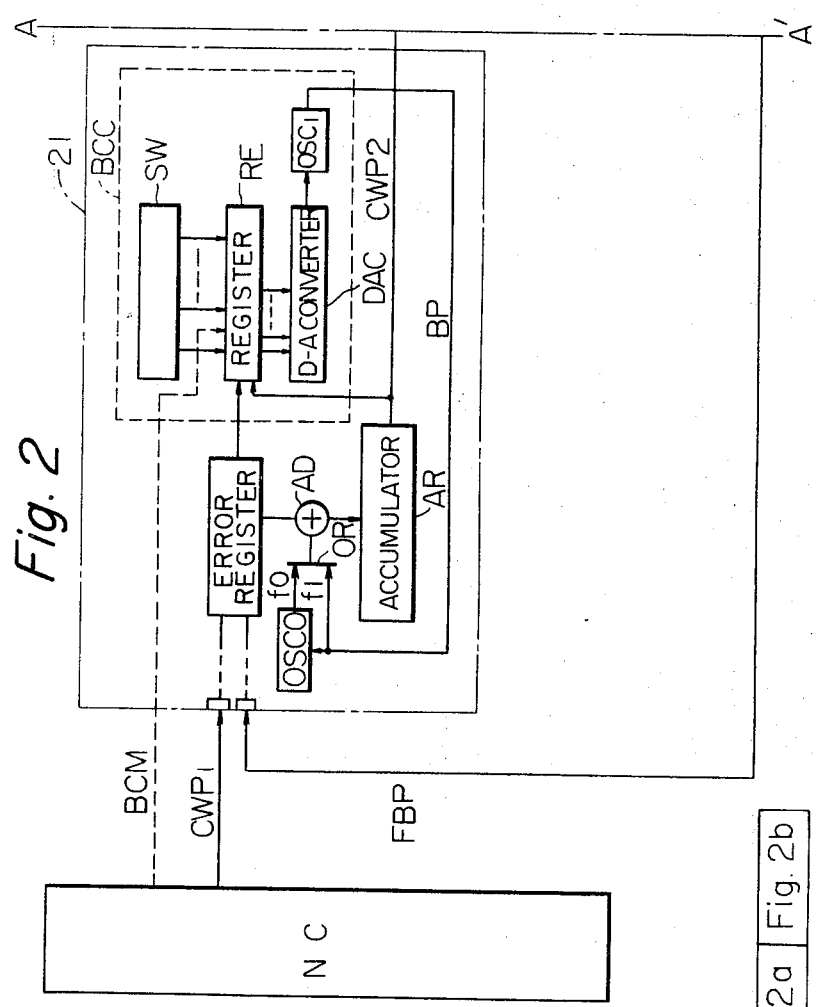

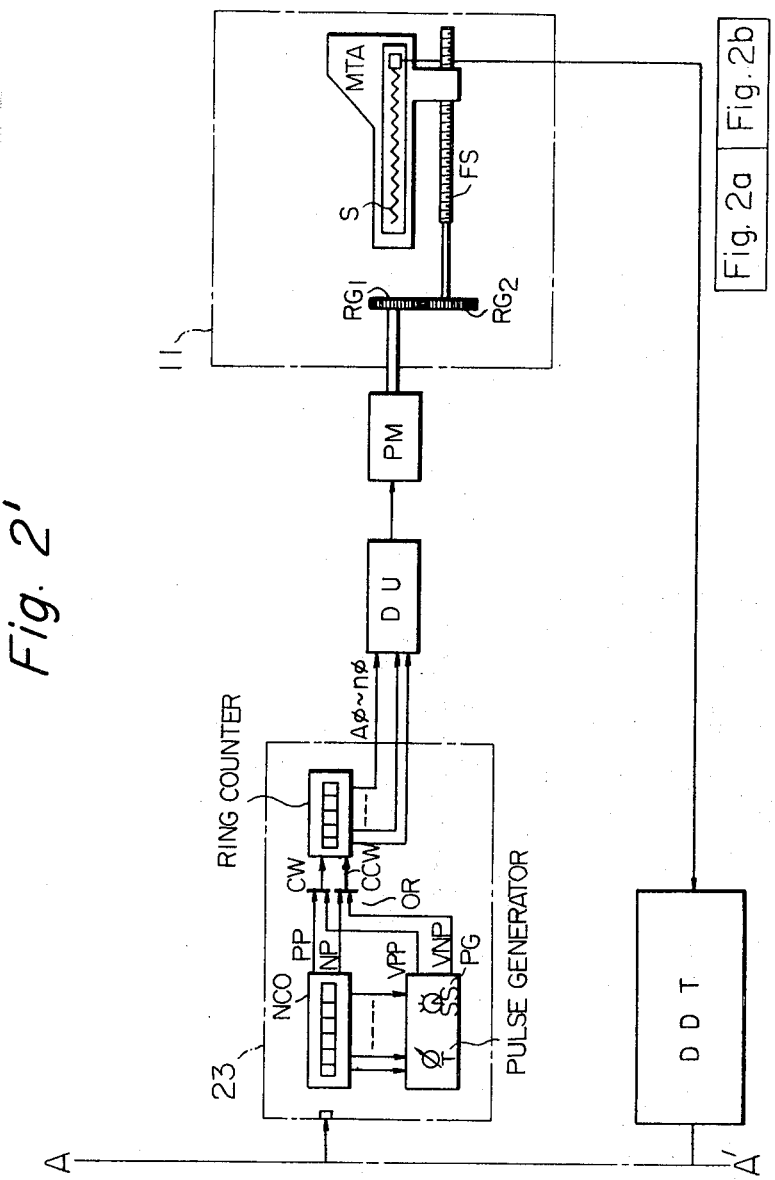

| Fig. 4a | Fig. 4b |

Fig. 5
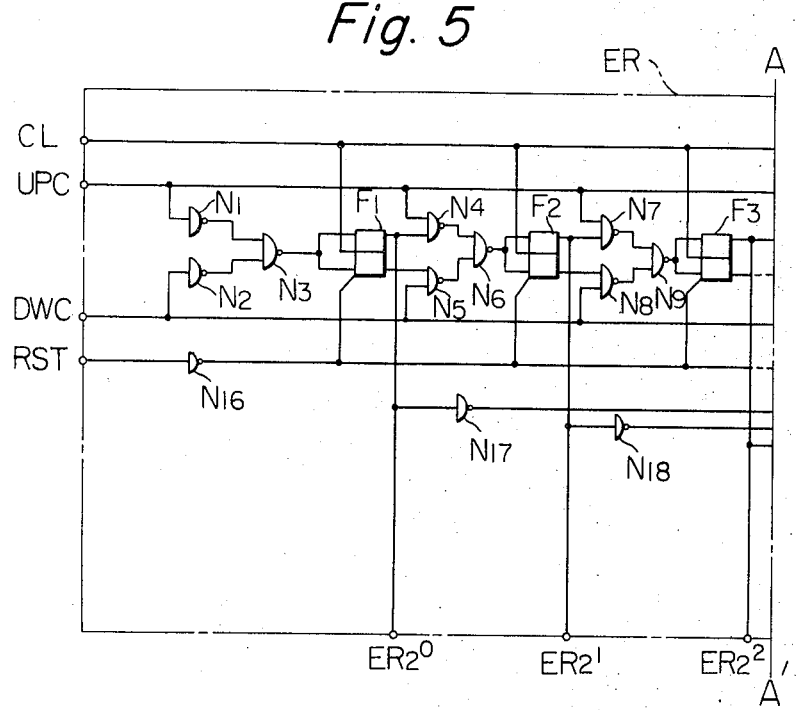
$$ERZ = \overline{ER2^0} \cdot \overline{ER2^1} \cdots \overline{ER2^{n-1}} \cdot \overline{ER2^n}$$
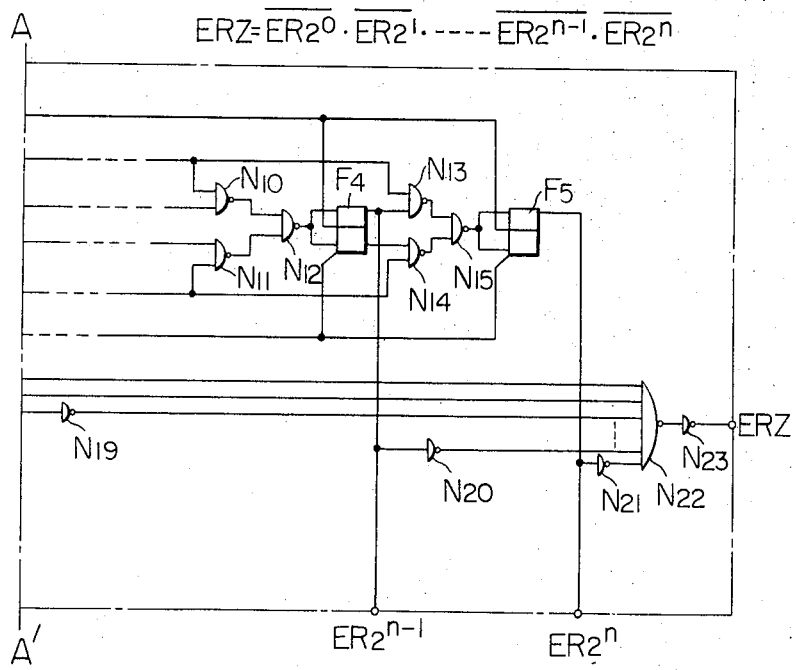

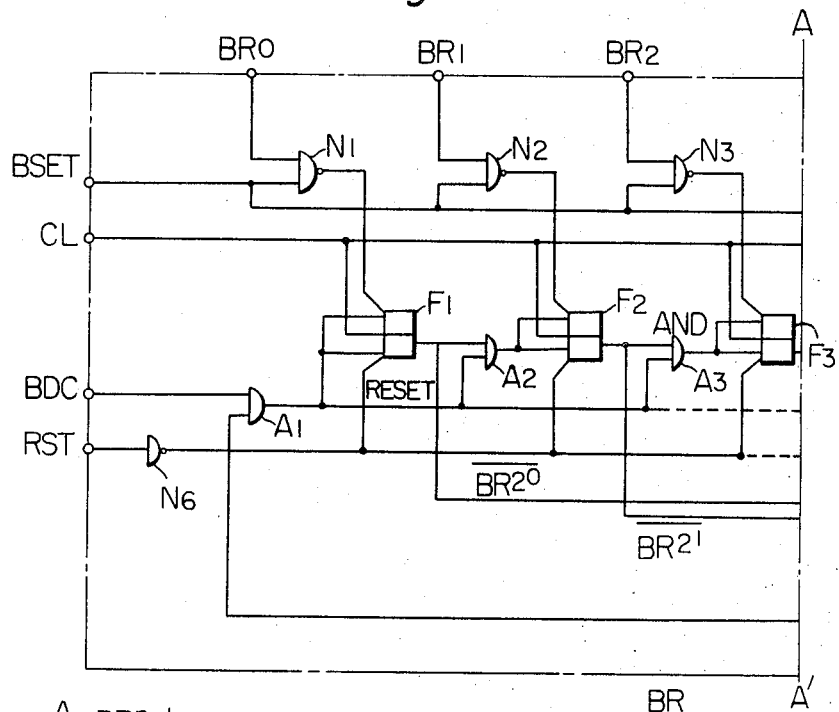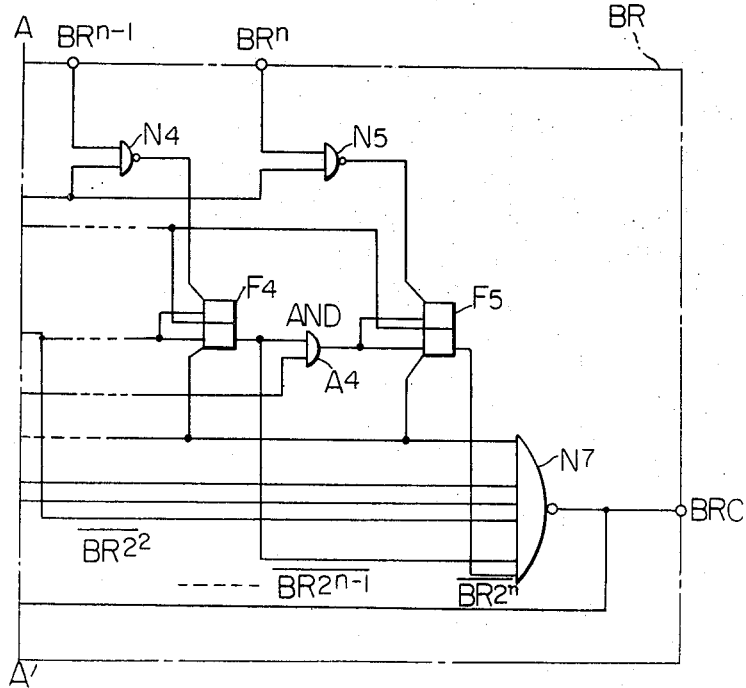
Fig. 9

NUMERICALLY CONTROLLED MACHINE TOOL INCLUDING BACKLASH ELIMINATION

DESCRIPTION OF THE INVENTION

The present invention relates to a method of numerically controlling a machine through a servo system, and more particularly relates to a method for compensating backlash and capable of being advantageously adopted for a closed-loop numerical control or open-loop numerical control with feedback compensation.

In the known servo system of a machine employing the above-mentioned closed loop numerical control method or open-loop numerical control method with feedback compensating function, final positioning of the machine is accurately controlled, even if the machine might have some amount of mechanical backlash, since a means for detecting the actual amount of the machine moved is provided and as a result, when the machine overshoots a desired position due to its mechanical errors and/or inertia thereof, the machine is always made to return to the desired position by supplying a command in the reversed direction in the servo system of the machine.

However, in this case, if the machine has some amount of mechanical backlash, the machine does not start the return movement until the mechanical backlash is completely taken up.

In other words, time necessary for taking up backlash can only the idle time.

The object of the present invention is to eliminate the above-mentioned drawback and to achieve rapid positioning of a machine by shortening the time necessary for removing the backlash of the machine during numerical control of a machine.

One of the features of the present invention is that every time a change of direction of movement of a machine is required, the gain of the whole servo system is momentarily heightened so that backlash of the machine is rapidly removed.

The present invention will now be more apparent from the ensuing descriptions of the several examples with reference to the accompanying drawings wherein:

FIG. 1 is a block diagram of an example of a numerical control system applying a method for compensating backlash in the system according to the present invention;

FIGS. 2, 3 and 4 are block diagrams of the second to the fourth examples of numerical control system applying the method for compensating backlash according to the present invention;

FIGS. 5 and 6 illustrate, respectively, examples of a detailed operation circuit and a direction discriminating circuit within the error register shown in FIG. 1 to FIG. 4;

FIG. 9 illustrates a detailed operation circuit for compensating backlash;

Referring to FIG. 1, command pulse train CWP from a numerical control unit NC is supplied to and accumulated in an error register ER. The content or value accumulated in the error register ER is sent to a digital to analogue converter DAC and converted into electrical voltages corresponding to the content of the error register ER.

The output from the converter DAC is supplied to a servo motor SM through a servo amplifier SA so as to drive a machine tool 11. In the machine tool, a feed screw mechanism FS is rotated by servo motor SM so as to move a work table MTA in a straight line. At the side of work table MTA, a detecting scale LS is provided so as to enable detection of the current position of work table MTA with respect to a certain origin. The amount of movement of machine tool 11 (that is to say, work table MTA) is detected by detecting scale LS and then, the corresponding analogue output derived from detecting scale LS is fed to an analogue to digital converter ADC used as a position detector and is converted into a feedback pulse train FBP which is fed to error register ER so as to subtract the value of the command pulse train CWP accumulated within the error register ER.

In accordance with the present invention, a direction discriminating means DD is provided for detecting reversal of the polarity of the content of error register ER which will occur in response to the fact that machine tool MT overshoots a set point by command pulse train CWP. Therefore, upon appearance of the output at the discriminating means DD, numerical values preliminarily set up in a setting means SW for setting up the amount of backlash to be compensated, are established in a register BR and then, the content of this register BR is converted by a digital to analogue converter DAC and the resulted analogue output from this digital to analogue converter DAC is used for momentarily heightening the gain of the whole servo system. Meanwhile a position coder PC and a pulse generating network PG is connected to servo motor SM through gears G whereby the amount of rotation of servo motor SM is converted into the corresponding pulse train by passing through both position coder PC and pulse generating network PG. This pulse train issuing from pluse generating network PG is fed to register BR via a gate GT to effectuate the subtraction from the content of register BR until the content of register BR becomes zero and the whole servo system again starts the normal numerical control operation.

Figure 1A:
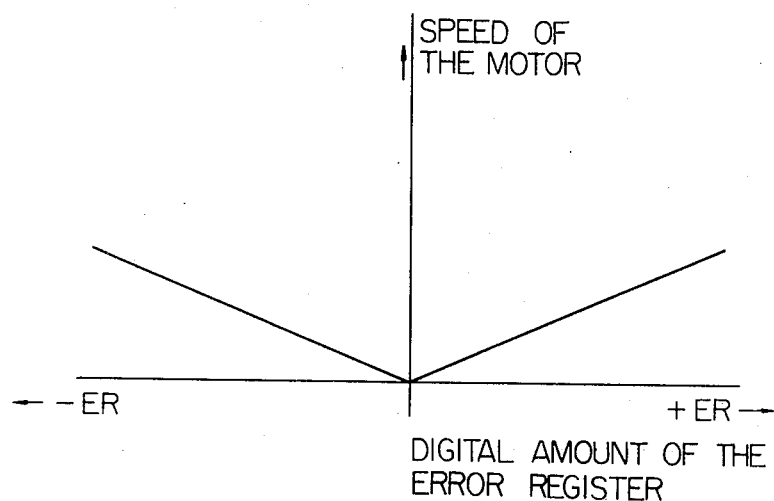
FIG. 1A is a graphical diagram illustrating the relationship between the content of the error register and the speed of revolution of the driving servo motor of FIG. 1.

FIG. 1A illustrates the relationship between the value of error register ER and the speed of revolution of servo motor SM in the case of the normal numerical control operation.

In the diagram of FIG. 1A, the abscissa shows the digital value accumulated in the error register ER, and the ordinate shows the speed of revolution of servo motor SM.

It should be understood from this diagram that when the digital value of error register ER is positive the servo motor SM rotates in the forward direction, and when the digital value of error register ER is negative, motor SM rotates in the reverse direction.

Figure 1B:
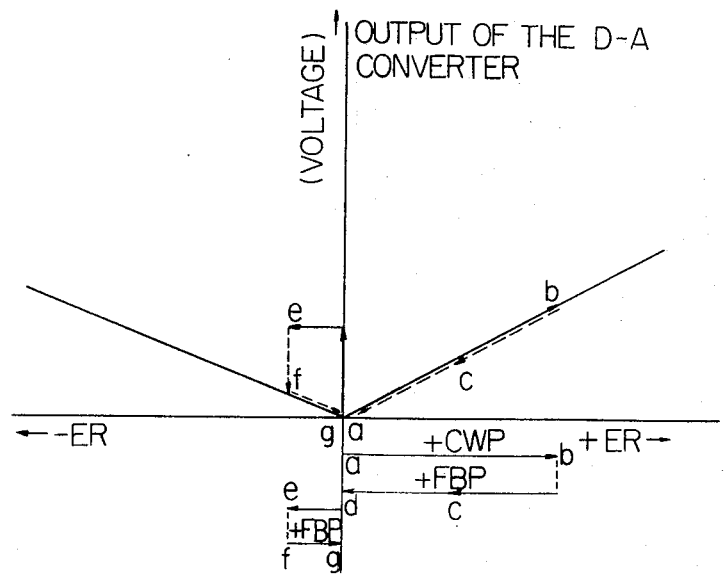
FIG. 1B is a graphical diagram illustrating the relationship between the content of the error register and the output of the D–A converter of FIG. 1.

FIG. 1B illustrates the relationship between the value of error register ER and the amount of output of digital to analogue converter DAC in the case where the compensation of backlash is carried out, that is to say, the abscissa shows the digital value of error register ER, while the ordinate shows the output voltage derived from D-A converter DAC.

Now, in the present invention, in accordance with the fact that a positive command pulse train +CWP continuously issues from numerical control unit NC, the content, or the digital value, of error register ER increases. However, at the samt time the content is subjected to subtraction by positive feedback pulse train +FBP which is fed to the subtracting input end of error register ER.

The above operation is shown in the diagram of FIG. 1B by path $a \rightarrow b \rightarrow c \rightarrow d$.

If the number of the feedback pulses +FBP become larger than the number of the command pulses +CWP because of the reasons that machine tool 11 exceeds the amount of movement commanded by the positive command pulses +CWP ($d \rightarrow e$ in the diagram) due to the large inertia of work table MTA, mechanical errors of the feed screw mechanism FS or to some other reasons, the content of error register ER which once became zero upon coincidence of both numbers of command pulses +CWP and feed-back pulses +FBP, again accumulates but negatively by the difference between command pulses +CWP and feedback pulses +FBP.

As a result, an output as a direction change signal appears at the output side of direction discriminating means DD and a preliminarily selected amount of backlash to be compensated is established in register BR as before mentioned. Therefore, a high output voltage (shown as e in the diagram of FIG. 1B) is obtained at the output side of D-A converter DAC so as to drive servo motor SM in the reverse direction at extremely high speed, even though the content of error register ER is reduced almost to zero. After servo motor SM rotates in the reverse direction to the extent that the remaining backlash is removed, register BR becomes zero and as a result, the output voltage from D-A converter DAC returns to normal (the point $f$ in the diagram of FIG. 1B), and therefore, machine tool 11 is driven to the set point g by servo motor SM at progressively reduced speed ($f \rightarrow g$ in the diagram of FIG. 1B).

FIG. 2 illustrates a method for compensating backlash adopted for use with a closed loop numerical control system using a step motor driven by an already provided method of vernier excitation. A vernier excitation circuit 23 consists of an N-number system counter NCO, a pluse generator PG mutually generating a normal rotation pulse train VPP and reverse rotation pulse train VNP at a P.R.F. which depends upon the content of the above-mentioned counter NCO, a ring counter RC to which a carry pulse and a borrow pulse from certain predetermined stages of the counter NCO are given as a normal rotation pulse PP and reverse rotation pulse NP, respectively, and an OR-gate OR through which pulses coming from the above-mentioned pulse generator PG are given to the ring counter RC as a normal rotation pulse CW or reverse rotation pulse CCW. DU shows a drive unit for a step motor PM which drives the feed screw mechanism FS of machine tool 11 through the meshing arrangement of gears RG1 and RG2. Thus, step motor PM rotates one step in response to one pulse of the output pulses PP or NP derived from N-number system counter NCO. However, the magnitude of the step of step motor PM corresponds to 1/N times the magnitude of the step which would be carried out by step motor PM if it were directly driven by input pulse train CWP2 as in the conventional manner. That is, step motor PM completes one conventional step of rotation when it is given N input pulses CWP2.

Command pulse train CWP1 issuing from numerical control unit NC accumulates in error register ER of servo system error detecting circuit 21, while the actual amount of movement of work table MTA detected by scale S, is fed to error register ER as a feedback pulse train FBP through a movement amount detector DDT so as to be subtracted from the value of the command pulse train CWP1 accumulated in the error register ER.

The content of error register ER is added to an accumulator AR every time a train of pulses having a constant frequency $f_o$ issuing from a pulse oscillator OSCO is given to an adder AD. Overflow pulses from accumulator AR become input pulses CWP2 to vernier excitation circuit 23 as a pulse train every time their frequencies are proportional to the momentary content of error register ER.

When the polarity of the value accumulated in error register ER is reversed due to reasons similar to those previously mentioned, referring to the first example of FIG. 1, numerical values preliminarily set up in a setting means SW for setting up the amount of backlash to be compensated, are established in register RE, and the content of register RE is converted to an analogue signal which is fed to a variable frequency pulse oscillator OSC1 and as a result, a pulse train BP having frequencies proportional to the content of the above-mentioned register RE is obtained at the output side of the variable frequency pulse oscillator OSC1. This pulse train BP stops the operation of oscillator OSCO while being fed to adder AD via OR gate OR so that the content of error register ER is added to accumulator AR by injection of every pulse of the pulse train BP.

By establishing the frequency $f_1$ of pulse train BP, when the content of register RE is the smallest value "1," to be almost equal to the frequency $f_o$ of the pulse train from oscillator OSCO, the interval between each addition of pulses BP to adder AD becomes smaller, when the amount of backlash set up by setting means SW is larger than the value "1," and as a result, the gain of the whole servo system is heightened. Overflow pulses from accumulator AR are also given to register RE so as to be successively subtracted from the content thereof as shown in FIG. 2, so that when the content of register RE logically becomes zero, the gain of the whole servo system returns to the normal state.

The set amount of backlash may be established in register RE as shown by the dotted line BCM in FIG. 2 in the case where the amount to be established is preliminarily registered in the memory elements of numerical control unit NC.

Figure 3:
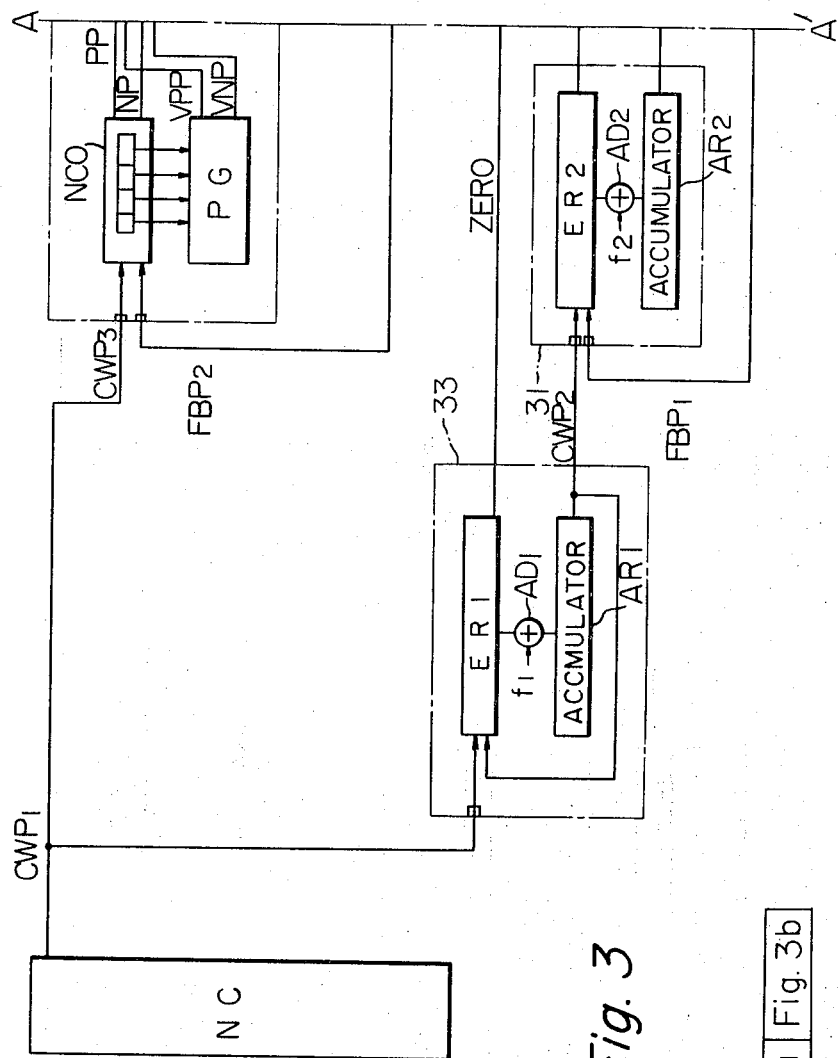
Figure 3:
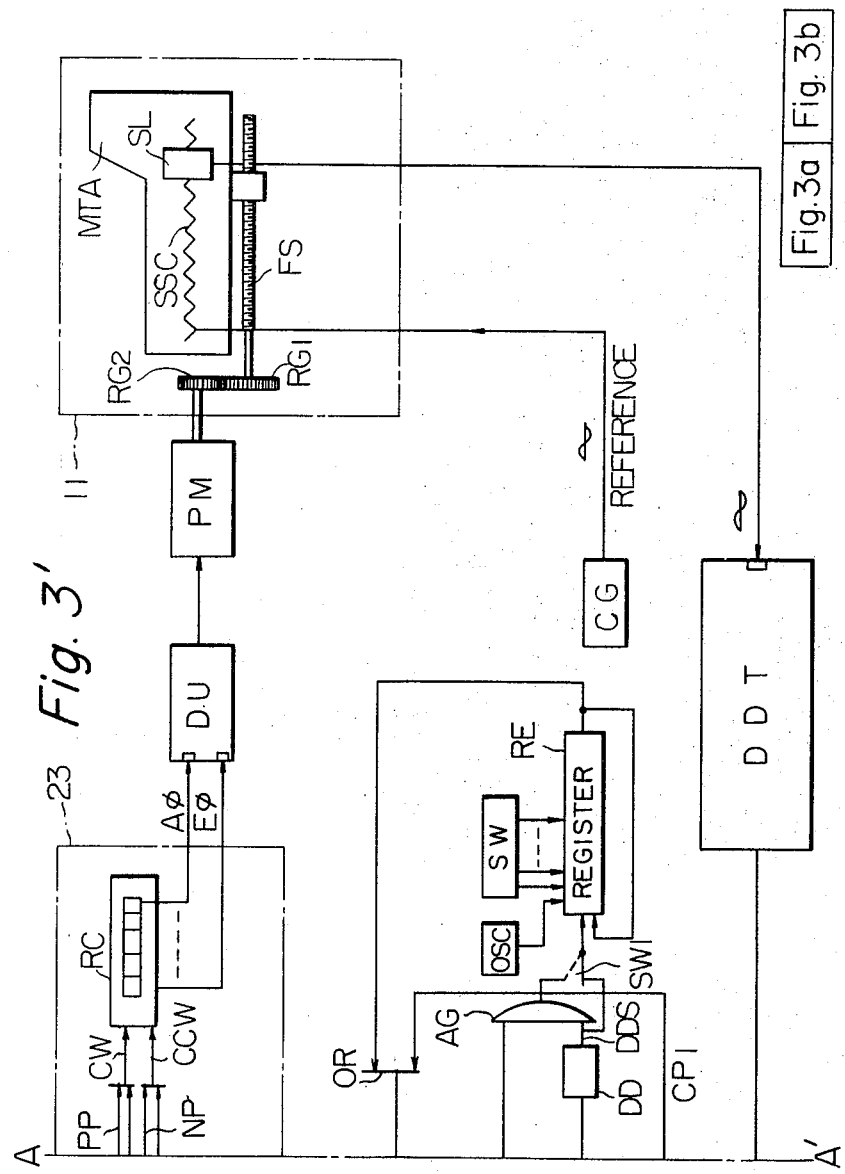

FIG. 3 shows a third example wherein the method of compensating backlash according to the present invention is adopted for a closed-loop numerical control system similar to the second example in FIG. 2 but has a further feedback function for compensating the error of the whole system.

In FIG. 3, a command pulse train CWP1 is fed to a servo error eliminating circuit 33 and to the above-mentioned vernier excitation circuit 23. The command pulse train CWP1 is accumulated in an error register ER1 of the servo error eliminating circuit 33, and then it is added to accumulator AR1 by means of an adder AD1 every time pulses arrive at the adder AD1 at the reference frequency $f_1$. Overflow pulses CWP2 of accumulator AR1 are fed back to register ER1 so as to be subtracted from the value of command pulses CWP1 accumulated in register ER1. However, these overflow pulses CWP2 have a certain time-lag with respect to the command pulses CWP1 which time-lag is always kept proportional to the frequency of the command pulses CWP1 and thus, provides the same delay effect as delay elements such as a step motor PM. Pulse train CWP2 is accumulated in an error register ER2 of a servo error detecting circuit 31, and the content of error register ER2 is added to an accumulator AR2 by means of an adder AD2 every time pulses arrive at the adder AD2 at a frequency $f_2$, and then the overflow pulses from accumulator AR2 becomes the compensating input for the vernier excitation circuit 23 via OR gate OR. That is to say, as feedback pulses FBP1 corresponding to the amount of movement of machine tool 11 are fed to error register ER2 so as to be subtracted from the amount of pulses CWP2 accumulated in error register ER2, the content of the error register ER2 expresses the deviation of the actual movement of machine tool 11 with respect to the set value desired by numerical control unit NC, and according to this deviation, compensating pulses CP1 are generated by accumulator AR2.

In the present invention, when the polarity of the content of error register ER2 is reversed due to the reasons mentioned previously, direction discriminating circuit DD immediately detects this reversal and the numerical value set up in a setting means SW such as for example, a switching means for setting up the amount of backlash to be compensated, is transferred and established in register ER and pulses issuing from a pulse oscillator OSC are issued as compensating pulses BP and simultaneously, fed back to register RE so as to be subtracted from the content of register RE one by one. Then, as soon as the content of register RE becomes "O," compensating pulses BP cease to be issued by oscillator OSC.

Now, it will be understood that if the direction of movement of machine tool 11 is changed, compensating pulses BP having a preselected frequency are added to the compensating loop via OR gate OR and as a result, the gain of the whole servo system is momentarily heightened.

However, in the third example of FIG. 3, modification can be made to the above-mentioned operation such that the compensation of backlash is restricted to be carried out only after the completion of the supply of the command pulse train CWP1. This restriction is extremely advantageous in the example of FIG. 3 for stability of the numerical control system, because the content of error register ER2 might change its polarity while command pulses CWP1 are still being supplied and as a result, the operation of compensating for the backlash of machine tool 11 is carried out. However, this is unfavourable for stability of the control system.

In this modification in the third example in FIG. 3, a signal "ZERO," of which the logical value becomes "1" when the content of error register ER1 becomes "O" and the output signal DDS of direction discriminating circuit DD may be arranged to be fed to an and-gate AG, and the output of this and-gate AG may be fed to register RE via a switch SW1 so that the output derived from this and-gate AG can be used as a setting signal for preliminarily establishing the amount of backlash to be compensated.

The content of error register ER1 becomes "O" after a certain time-lag from the completion of the supply of command pulse train CWP1 and thereafter, in the case where the polarity of the content of error register ER2 is changed there appears a logical value "1" at the output of the and-gate AG. Therefore, if the switch SW1 is switched to a state shown by the dotted line in FIG. 3, a preselected amount of backlash is preliminarily established in register RE and the operation for compensating the backlash of the machine tool starts.

In FIG. 3, CG is a reference signal setter, SS is a scale and SC is a slider cooperating with scale SS.

Figure 4:
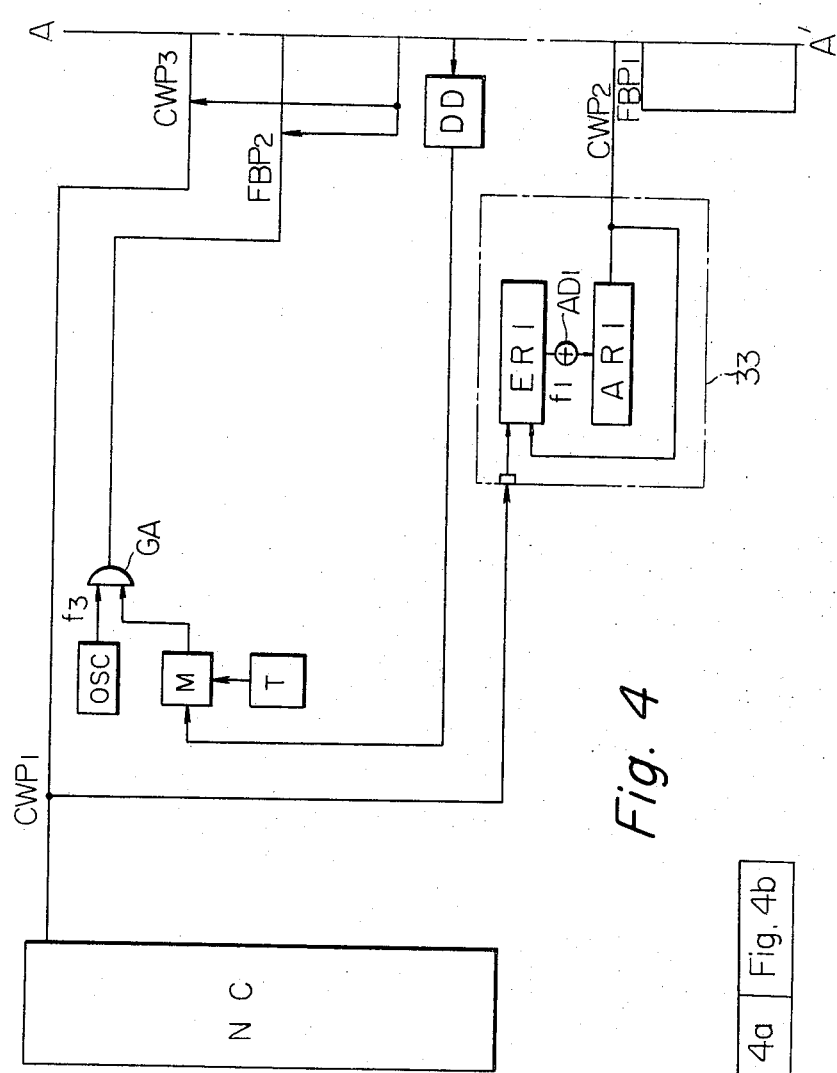
Figure 4:
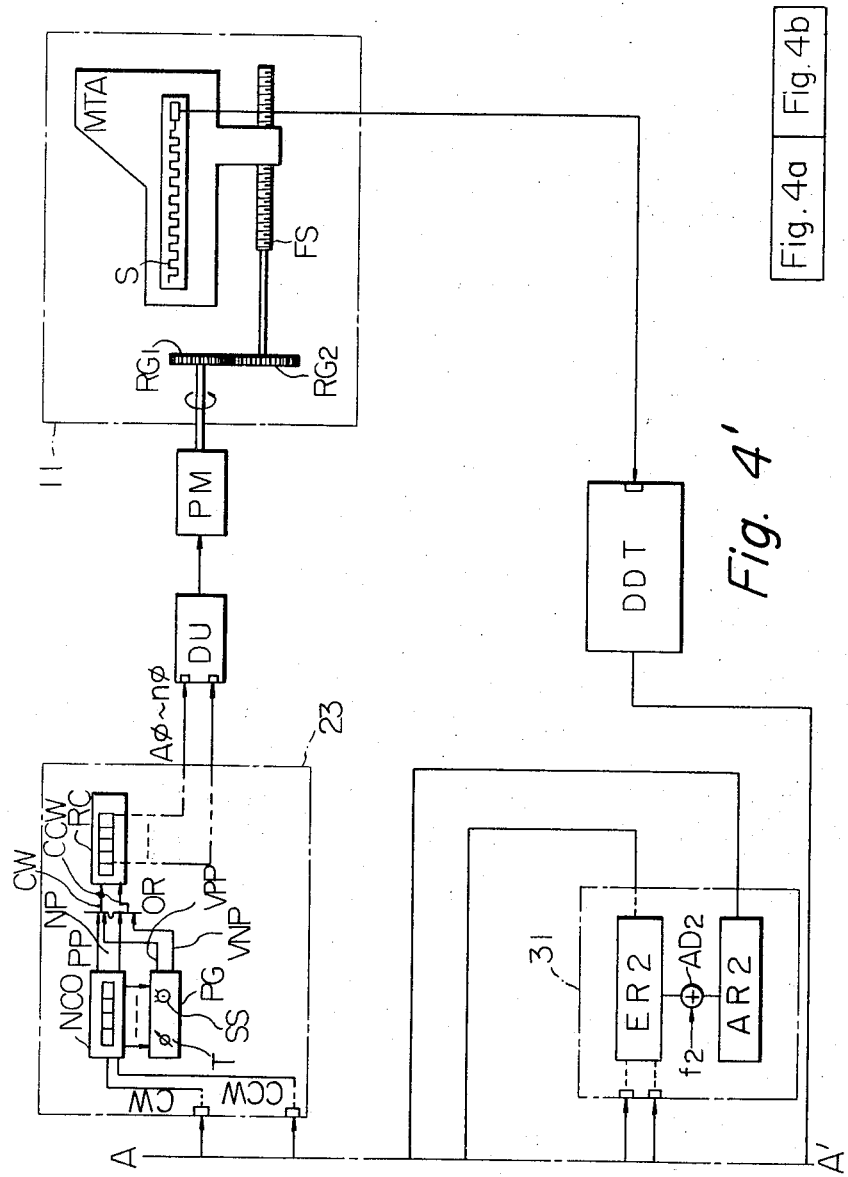

FIG. 4 shows the fourth example of the present invention.

In this example, when the polarity of the content of error register ER2 is changed, a mono stable multivibrator M is operated via direction discriminating circuit DD. The multivibrator M emits a pulse which opens gate GA. This allows a constant frequency of $f_3$ which is continuously generated by the oscillator OSC to be applied to vernier excitation circuit 23 via gate GA for a time determined by a time setter T.

Of course, a modification similar to the above-mentioned third example can be made in this fourth example.

Now, the detailed arrangements of the respective circuit means used in the above-mentioned examples of the present invention will be explained.

FIG. 5 is a detailed operational circuit of the error registers ER, ER1 and ER2.

In FIG. 5, N1 to N23 are nand circuits, and F1 to F5 are flip-flops. UPC is an add signal, and when this add signal has the logical value "1," the register ER counts up the number of clock pulses CL. DWC is a subtract signal, and when this subtract signal has the logical value "1," the register ER counts down the number of clock pulses CL.

That is to say, each of the flip-flops F1 to F5 reverses it's state upon injection of the clock pulses so that the states of the output "set" and the output "reset" are mutually interchanged, when an input signal, the logical value of which is "1," is fed to the mutually connected inputs of each of the flip-flops F1 to F5.

RTS is the "reset" input signal by which the respective flip-flops F1 to F5 are preliminarily put into the "reset" state whereby the outputs of the respective flip-flops in the "set" state have the logical value "O" and the outputs of the respective flip-flops in the "reset" state have the logical value "1" when the electric source (not shown) is switched on.

Now, in the state where signal UPC of the logical value "1" is being supplied, when one of the clock pulses CL is injected, the flip-flop F1 reverses it's state so that the output in the "set" state thereof has the logical value "1." Therefore, the output of the nand gate N4 becomes "O" and the input of the flip-flop F2 becomes "1." As a result of this, when a second clock pulse CL is injected, the flip-flop F2 also reverses it's state. Thus the binary counting up operation is carried out in order, in error register ER.

Also, in the state where signal DWC of the logical value "1" is being supplied, when clock pulse train CL is injected, the binary counting down operation is carried out in order, in a similar manner to the above-mentioned counting up operation.

The output ERZ of the nand gate N23 has the logical value "1" when the content of error register ER is "O" and otherwise, the output ERZ of the nand gate N23 has the logical value "O."

Figure 6:
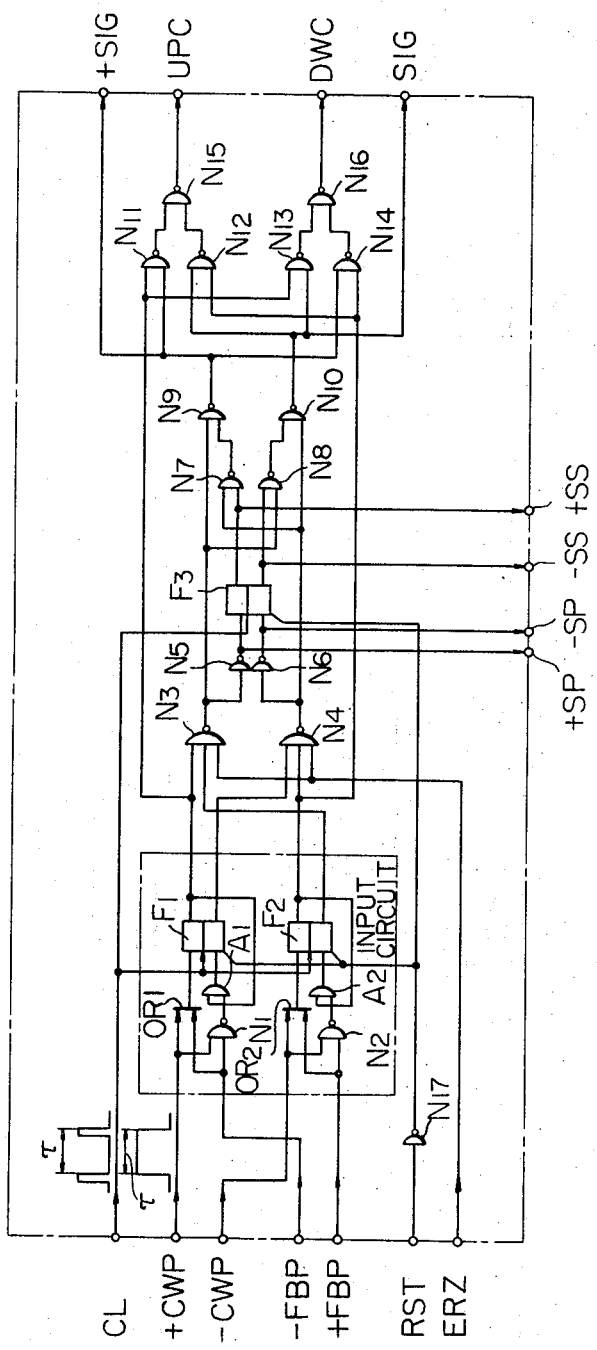

FIG. 6 is a direction discriminating circuit contained within the error register whereby the directions of the operation circuit of FIG. 5 in which the command pulse train and the feedback pulse train which are supplied to the error register are impressed are determined.

That is to say, since the content of the error register can only be in the state of zero up to full count as later described, the direction discriminating circuit of FIG. 6 determines whether each of the positive command pulse train +CWP, the positive feedback pulse train +FBP resulting from the movement of the machine tool 11 in the positive direction, the negative command pulse train −CWP, the negative feedback pulse train −FBP resulting from the movement of the machine tool 11 in the negative direction should be counted up or counted down in the error register.

In FIG. 6, N1 to N17 show nand circuits, and A1 and A2 show and circuits.

ERZ is a signal which has the logical value "1" or "O" corresponding to whether the content of the error register is zero or not.

RTS is a "RESET" signal for resetting flip-flops F1, F2 and F3 to their initial states.

Also, the output signal UPC is an add signal for the error register, and the output DWC is a subtract signal.

The symbol +SIG expresses that the sign of the value accumulated in the error register is positive, if the signal +SIG has the value "1," and the symbol +SIG expresses that the sign is negative, if it has the value "1."

The signals +SP, −SP, −SS and +SS are outputs used for detecting the change of direction and are fed to the direction discriminating circuit DD, as explained later, so as to cause the circuit DD to generate a signal signifying detection of the change of direction and having a width of one clock time interval $\tau$ as shown in FIG. 6.

Now, the operation of the circuit of FIG. 6 will be explained assuming that in FIG. 6, each of the flip-flops F1 to F3 is put into the "RESET" state, that is, its output "SET" is "O" and its output "RESET" is "1."

Also, it will be assumed that the content of the error register is zero. In this case, it should be understood that in each of the flips-flops F1 to F3, the output "SET" becomes "1" upon injection of a clock pulse when the input "SET" thereof is "1" and the output "RESET" of the flip-flop becomes "1" upon injection of a clock pulse when the input "RESET" thereof is "1."

1. When one of the positive command pulses +CWP is present, an add signal UPC of the error register is produced over one clock time interval and simultaneously, the signal +SIG becomes "1" and thus, the value accumulated, thereafter, in the error register will be positive.

While the positive command pulses +CWP are successively impressed, the add signal is produced over one clock time interval $\tau$ for every positive command pulse +CWP, and thus, the content of the error register is progressively counted up by the number of positive command pulses received as explained before.

2. When positive feedback pulses +FBP resulting from the movement of the machine tool in the positive direction, are received by the error register, the subtract signal is procuded for every positive feedback pulse +FBP and as a result, the content of the error register is counted down by the number of pulses +FBP received.

3. When positived feedback pulses +FBP, equal in number to the number of positive command pulses +CWP already received by the error register, are impressed along the feedback loop, the content of the error register becomes zero. However, thereafter, if the positive feedback pulses +FBP are excessive due to reasons such as the error of the feeding screw mechanism of the machine tool, the signal −SIG is produced by the receipt in the error register of the first pulse of the excessive positive feedback pulses +FBP and then, the add signal is repeatedly produced so that all the excessive positive feedback pulses +FBP are counted up in the error register.

4. After completion of receipt of the positive command pulses +CWP by the error register but during impression of the positive feedback pulses +FBP, if the negative command pulses −CWP are impressed, these pulses −CWP serve to produce subtract signals DWC as well as the feedback pulses +FBP so that the error register is counted down.

5. In the above case (4), if in the case that one of the positive feedback pulses +FBP and one of the negative command pulses are simultaneously impressed, the subtract signal is produced over two clock time intervals.

Figure 7:
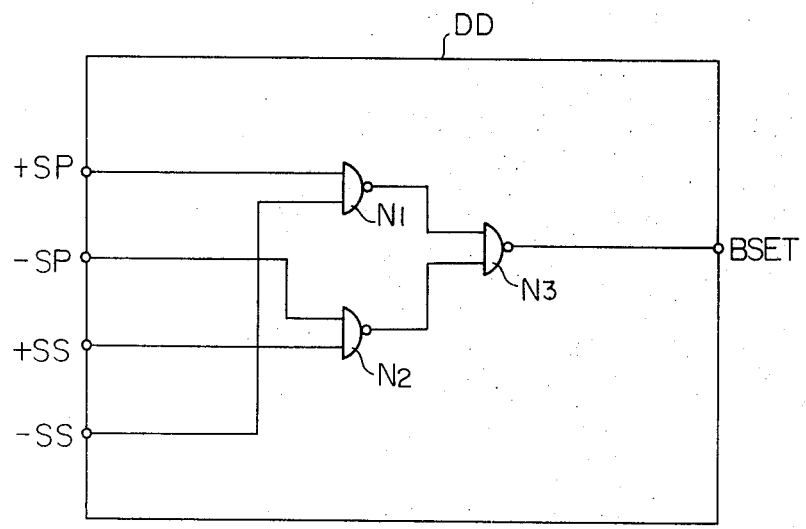
FIG. 7 illustrates an example of the direction discrimination circuit DD shown in FIGS. 1, 2, 3 and 4.

6. The signals +SP, −SP, −SS and +SS by which the change of sign of the value accumulated in the error register is detected are impressed to the direction discriminating circuit DD as shown in FIG. 7.

The signals +SP, −SP, −SS and +SS change according to the following table, respectively.

TABLE 1

| Signal | The initial state | Flip-flop F1 SET with error register being zero (The positive direction) | Flip-flop F3 SET | Flip-flop F2 SET with error register being zero (The negative direction) | Flip-flop F2 RESET |
|---|---|---|---|---|---|
| +SP | 0 | 1 | 0 | 0 | 0 |
| −SP | 0 | 0 | 0 | 1 | 0 |
| −SS | 1 | 1 | 0 | 0 | 1 |
| +SS | 0 | 0 | 1 | 1 | 1 |

FIG. 7 is a detailed arrangement of the direction discriminating circuit DD.

In the circuit DD, a signal BSET for setting up the amount of backlash to be compensated, is produced in response to the "SET" or "RESET" of the flip-flop F3 of FIG. 6.

N1 to N3 are nand circuits.

Figure 8:
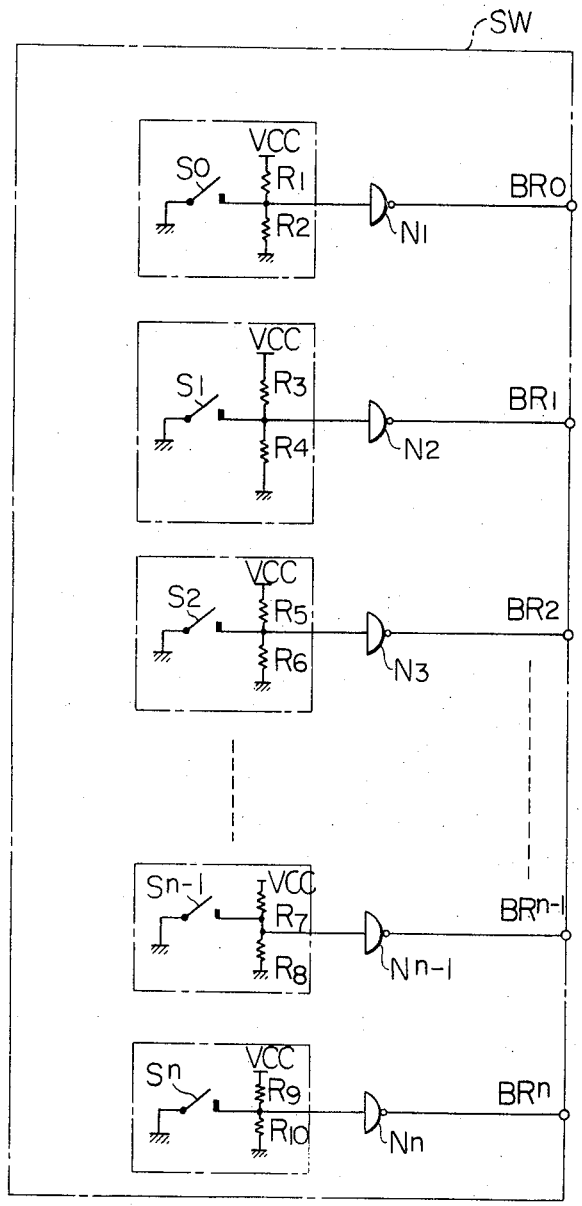
FIG. 8 illustrates a switching means for setting the amount of backlash to be compensated.

FIG. 8 is a switching means for setting the amount of backlash to be compensated.

In FIG. 8, respective switches S0, S1, S2 . . . S$n$–1, and S$n$ have weights of $2^0$, $2^1$, $2^2$, . . . $2^{n-1}$ and $2^n$ corresponding to figures of the binary number system, respectively.

If the switches are closed, the signals BR0 to BRN derived from the repective output ends have the logical value "1," and if the switches are opened, the signals BR0 to BRN have the logical value "0."

Therefore, if it is desired to set the numeral "5" (pulses) for the amount of backlash to be compensated, only two switches S2 and S0 are closed and the other switches are left open.

That is, the signals BR2 and BR0 will have the logical value "1," while the other signals will have the logical value "0."

FIG. 9 shows the detailed circuit of the register BR for compensating backlash.

In the circuit of FIG. 9, N1 to N7 are nand circuits and A1 to A4 are and-gates, and moreover, F1 to F5 are flip-flops.

The flip-flops F1 to F5 are arranged so as to serve as subtract counters having weights of $2^0$, $2^1$, $2^2$, . . . $2^n$, respectively, which weights correspond to those of the respective switches as shown in FIG. 8, and when the signal RST becomes "1," all flip-flops F1 to F5 are reset to their initial states.

When a change of direction is detected by the direction discriminating circuit DD in the manner previously explained, the signal BSET for setting up the amount of backlash becomes "1" and the numerical value set in the switching means of FIG. 8 is established in the register BR, that is, in the corresponding flip-flops of the register BR.

For example, if the numerical value "5" is set in the switching means SW of FIG. 8, the flip-flops F1 and F3 are set as mentioned before.

Pulses derived from the position coder PC of FIG. 1, are fed to and-gate A1 as subtract pulses BDC to be subtracted from the register BR.

As a signal BRC, which becomes "1" when the content of the register BR is not "0," is fed to the other input of and-gate A1, the pulses BDC are fed to the respective flip-flops F1 to F5 until the content of the register BR becomes zero.

It will be understood that the content of the register BR is counted down by the passage of every pulse BDC through and-gate A1 as in the case of the error register ER.

Figure 10:
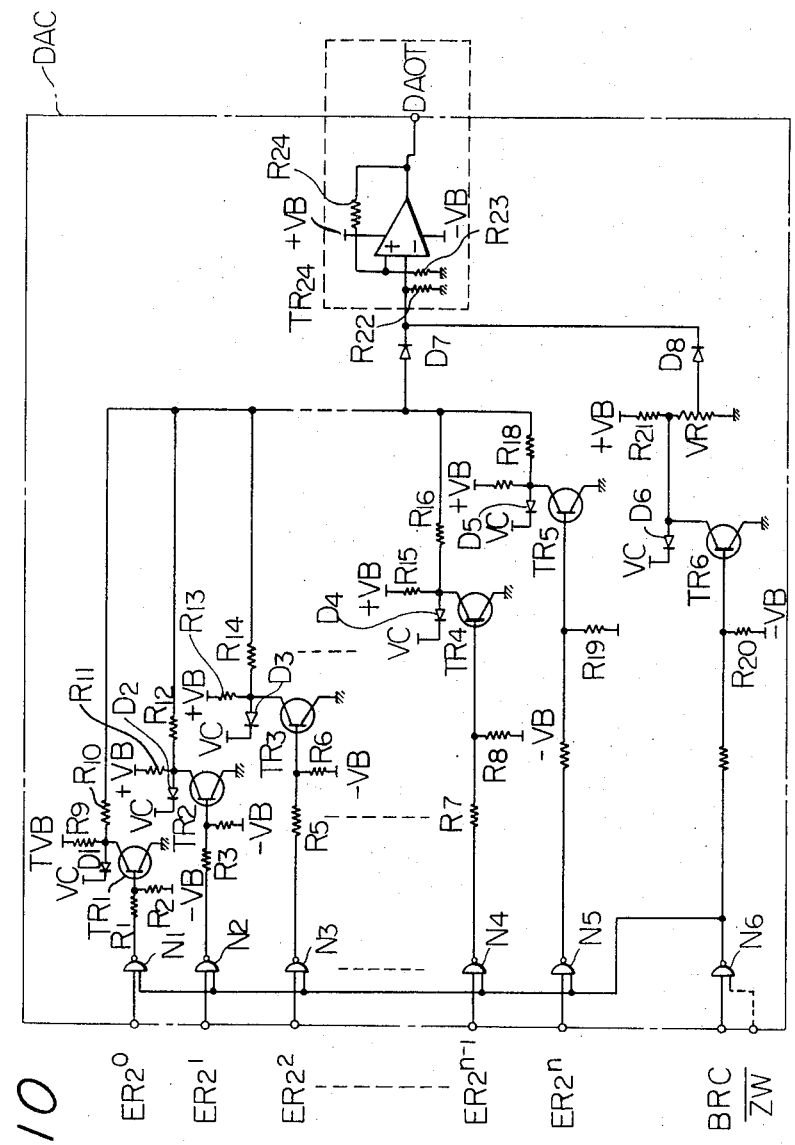
FIG. 10 is an example of the circuit of D–A converter.

FIG. 10 shows an example of the digital to analogue converter DAC.

The D-A converter DAC produces voltages, the values of which are proportional to the content (that is, the digital quantity) of the error register ER and simultaneously, the D-A converter DAC feeds a certain voltage to an operational amplifier OA during the backlash compensating operation by the signal BRC which is the signal which becomes "1" when the content of the register BR is not zero.

The signals ER$2^0$, ER$2^1$, . . . , ER$2^n$ from the respective figures of the error register are connected to transisters TR1 to TR6 via the corresponding nand circuits N1 to N5.

When the transisters TR1 to TR6 are ON, resistances R9, R11, R13, R15 and R17 are disconnected from the operational amplifier OA, respectively.

During ordinary control operation of the numerical control system without the operation for compensating backlash, the signal BRC is "0" and as a result, the output of nand gate N6 is "1," so that only transisters corresponding to the figures of the error register from which the outputs "1" are issued, come OFF, therefore, a current signal or a voltage signal proportional to the content of the error register can be obtained from the output DAOT of the operational amplifier OA by preliminarily applying suitable weights to the above-mentioned resistances.

During the operation of compensating for backlash, the signal BRC becomes "1" whereby the output of nand gate N6 becomes "0" so that transisters TR1 to TR5 come ON and only transister TR6 comes OFF, thus the voltage across the variable resistance VR is impressed to the operational amplifier OA. Therefore, by making the output of the operational amplifier OA larger under the input of voltage from the variable resistance VR than that under digital to analogue conversion of the actual value of the error register, the gain of the whole numerical control system can be heightened.

Now, the input of a signal $\overline{ZW}$ to nand gate N6 prevents the operation for compensating backlash from being carried out within a zero domain having a certain extent which domain is preselectively established in the content of the error register with respect to the central value zero.

This signal $\overline{ZW}$ becomes "0" when the content of the error register is within the zero domain as explained later.

Therefore, even if the change of direction takes place within the zero domain, the output of nand gate N6 is "1" and the transister TR6 is OFF, since the signal $\overline{ZW}$ is zero and thus, only the ordinary operation is carried out.

Figure 11:
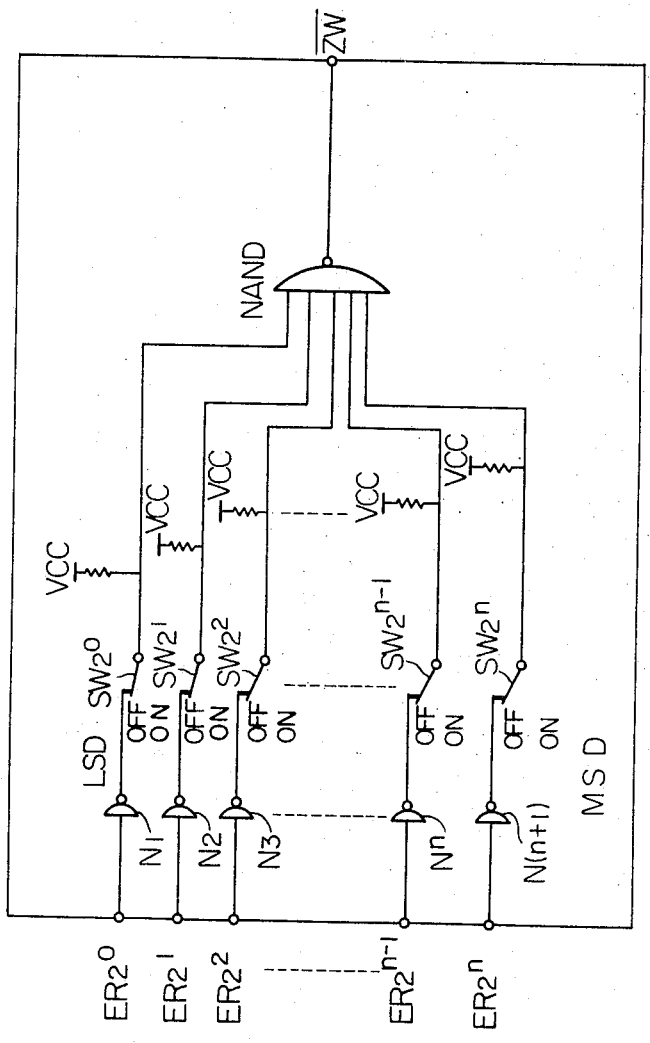
FIG. 11 is a setting circuit for setting zero domain.

FIG. 11 is a zero domain setting circuit. For setting the domain, several switches are switched OFF continuously from the lower figure LSD.

Now, if switches SW$2^0$ and SW$2^1$ only are switched OFF and the other switches are left ON, the output $\overline{ZW}$ becomes "0" when the content of the error register is smaller than the numerical value "3" and it becomes "1" when the content of the error register is greater than "4."

Therefore, the zero domain ZD is established in the content of the error register in both positive and negative directions as expressed by the following inequality.

$$-3 \leq ZD \leq 3$$

It will be understood that according to the present invention, when the direction of the movement of the machine tool is commanded to reverse, the loop gain of the whole servo system is momentarily heightened, so that the machine tool reaches the desired position in an extremely short time even if there exists some mechanical backlash.

What is claimed is:

1. A backlash compensating system adapted for use in a numerical control system which includes means for generating a command signal, a servo error detecting circuit to which said command signal is supplied, a controlled machine having a movable part, a servo system having drive means for moving said movable part of the machine to a desired position, and feedback means for performing feedback of an actual position of said movable part to said servo error detecting circuit, comprising:

- direction discriminating means for discriminating the polarity of said servo error detecting circuit;
- backlash compensating circuits providing backlash compensation input signals to said drive means depending upon said detection of said detection discriminating means;
- means for heightening the gain of said servo system, and
- circuit means connected between said backlash compensating circuits and said gain heightening means so that said gain of said servo system is increased solely during said provision of said backlash compensating input signals.

2. A backlash compensating system as claimed in claim 1 wherein said backlash compensating circuits are provided with means establishing the duration of provision of said backlash compensation input signals.

3. A backlash compensating system as claimed in claim 1 wherein said backlash compensating circuits are provided with means preliminarily establishing the amount of backlash to be compensated for the machine.

4. A backlash compensating system as claimed in claim 1 further comprising means for operating said backlash compensating circuits and said gain heightening means after completion of said command from said command means.

5. A backlash compensating system as claimed in claim 1 further comprising meand for setting a preselected amount of change of said moving direction of said movable part of said machine, within which amount said setting means prevents said backlash compensating circuits and said gain heightening means from operating.

* * * * *